(12) United States Patent
Malla

(10) Patent No.: US 9,953,534 B1
(45) Date of Patent: Apr. 24, 2018

(54) VEHICLE COLLISION WARNINGS BASED ON A TIME-TO-COLLISION

(71) Applicant: Ford Global Technologies, LLC, Dearborn, MI (US)

(72) Inventor: Rijan Malla, Inkster, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/299,042

(22) Filed: Oct. 20, 2016

(51) Int. Cl.
*G08G 1/16* (2006.01)

(52) U.S. Cl.
CPC ............. *G08G 1/163* (2013.01); *G08G 1/166* (2013.01)

(58) Field of Classification Search
CPC ........ G08G 1/163; G08G 1/165; G08G 1/166; G08G 1/168; G08G 1/16; B60Q 9/006; B60Q 9/007; B60Q 9/008
USPC ............ 340/435, 436, 438, 441, 932.2, 903; 180/167, 168; 702/143, 150
See application file for complete search history.

(56) References Cited

U.S. PATENT DOCUMENTS

| | | | |
|---|---|---|---|
| 6,594,614 B2 | 7/2003 | Studt et al. | |
| 7,126,461 B2* | 10/2006 | Takeichi | B60Q 9/006 180/169 |
| 7,375,620 B2 | 5/2008 | Balbale et al. | |
| 7,385,487 B2* | 6/2008 | Simonazzi | G01S 15/931 340/435 |
| 7,786,896 B2 | 8/2010 | Schmid et al. | |
| 7,830,244 B2* | 11/2010 | Kim | B60Q 9/004 180/169 |
| 8,018,351 B2* | 9/2011 | Hering | B62D 15/027 340/932.2 |
| 8,648,702 B2* | 2/2014 | Pala | G01S 7/4863 340/435 |
| 8,649,952 B2 | 2/2014 | Nedorezov et al. | |
| 8,779,939 B2* | 7/2014 | Barth | B62D 15/027 180/199 |
| 2014/0203925 A1* | 7/2014 | Augst | B60Q 9/007 340/435 |

FOREIGN PATENT DOCUMENTS

| | | |
|---|---|---|
| CN | 104512394 A1 | 4/2015 |
| DE | 102005034277 A1 | 2/2007 |
| KR | 20050100988 B6 | 10/2005 |

* cited by examiner

*Primary Examiner* — Hung T Nguyen
(74) *Attorney, Agent, or Firm* — James P. Muraff; Neal, Gerber & Eisenberg LLP

(57) ABSTRACT

Method, apparatus, and computer storage media are disclosed for vehicle collision warnings based on a time-to-collision. An example vehicle includes a sensor to detect an object, a speed sensor to measure a current speed, and a collision alerter. The example collision alerter is to determine a distance to the object and determine a time-to-collision based on the distance and the current speed. Also, the example collision alerter is to emit, in response to the time-to-collision being less than or equal to a first collision threshold, a first alarm associated with the first collision threshold.

18 Claims, 4 Drawing Sheets

VEHICLE COLLISION WARNINGS BASED ON A TIME-TO-COLLISION

TECHNICAL FIELD

The present disclosure generally relates to collision warnings and, more specifically, vehicle collision warnings based on a time-to-collision.

BACKGROUND

Generally, drivers of vehicles are concerned with colliding with other objects (e.g., other vehicles). For example, many drivers are concerned about colliding with an object behind the vehicle while driving the vehicle in reverse (e.g., while parallel parking, while backing out of a parking spot, etc.). Some vehicles include a back-up camera that captures images of an area around a rear of the vehicle. The images captured by the back-up camera are displayed via a screen located on a dashboard or in center console of the vehicle to improve visibility of the area behind the vehicle for the driver and, thus, to facilitate the driver to avoid colliding with an object located behind the vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown for vehicle collision warnings based on a time-to-collision. An example disclosed vehicle includes a sensor to detect an object, a speed sensor to measure a current speed, and a collision alerter. The example collision alerter is to determine a distance to the object and determine a time-to-collision based on the distance and the current speed. Also, the example collision alerter is to emit, in response to the time-to-collision being less than or equal to a first collision threshold, a first alarm associated with the first collision threshold.

An example disclosed method to emit a vehicle collision warning includes detecting an object via a sensor of a vehicle, determining a distance to the object, and measuring a current speed of the vehicle via a speed sensor. The example method also includes determining, via a processor, a time-to-collision based on the distance and the current speed and emitting a first alarm in response to the time-to-collision being less than or equal to a first collision threshold.

An example tangible computer storage medium includes instructions, which, when executed, cause a machine to detect an object via a sensor of a vehicle, determine a distance to the object, and measure a current speed of the vehicle via a speed sensor. The example instructions also cause the machine to determine, via a processor, a time-to-collision based on the distance and the current speed and emit a first alarm in response to the time-to-collision being less than or equal to a first collision threshold.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
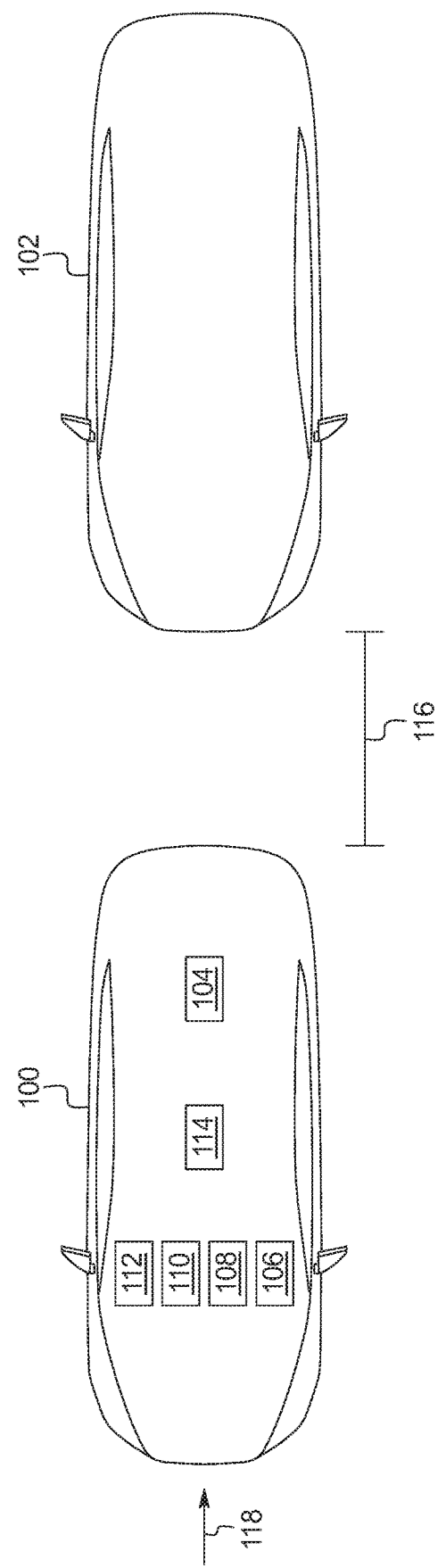
FIG. 1 illustrates a vehicle including an example collision alerter in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Drivers of vehicles typically are concerned with colliding with other objects (e.g., other vehicles). In particular, many drivers are concerned about colliding with an object behind the vehicle while the vehicle is in reverse. For example, collisions with other vehicles potentially may occur while parallel parking and/or while backing out of a parking spot. To avoid collisions while in reverse, some vehicles include a back-up camera that captures images of an area around a rear of the vehicle. The images captured by the back-up camera are displayed via a screen located on a dashboard or in center console of the vehicle to improve visibility of the area behind the vehicle for the driver and, thus, to facilitate the driver to avoid colliding with an object located behind the vehicle. However, in some such instances, the driver of the vehicle may not be looking at the screen while driving the vehicle in reverse.

The example apparatus, methods, and computer readable media disclosed herein determines a time-to-collision between a vehicle and a nearby object and provides a warning to a driver based on the time-to-collision. If the calculated time-to-collision is less than a first collision threshold, the vehicle emits a first alarm (e.g., an uninterrupted audible signal) to warn the driver of a potentially imminent collision with the nearby object. Alternatively, if the calculated time-to-collision is less than a second collision threshold but greater than the first collision threshold, the vehicle emits a second alarm (e.g., an intermittent audible signal) to warn the driver of a potential collision that is less imminent than that associated with the first alarm.

An example vehicle disclosed herein include a sensor (e.g., an ultrasonic sensor) to detect and locate a nearby object and a speed sensor to measure a current speed of the vehicle. The example vehicle also includes a collision alerter that determines a distance between the vehicle and the object. Further, the collision alerter determines a time-to-collision based on the current speed of the vehicle and the distance between the vehicle and the object. The collision alerter also compares the time-to-collision with a first collision threshold that is associated with a potentially imminent collision. In response to the time-to-collision being less than or equal to the first collision threshold, the collision alerter emits a first alarm (e.g., an uninterrupted audible signal) to warn the driver of the potentially imminent collision. The collision alerter also may emit the first alarm in response to the collision alerter determining that the vehicle is within a threshold distance (e.g., 0.03 meters or 1.18 inches) of the object. By providing the first alarm, the collision alerter facilitates the driver to decelerate the vehicle to reduce (e.g., eliminate) a collision impact with the detected object.

When the time-to-collision is not less than or equal to (e.g., is greater than) the first collision threshold, the collision alerter determines a predicted speed of the vehicle. The predicted speed may be different than the current speed if the vehicle is accelerating or decelerating. For example, a pedal sensor monitors a gas pedal and/or a brake pedal of the vehicle to measure pedal dynamics, and the collision alerter determines the predicted speed based on the current speed and the pedal dynamics of the vehicle. Upon determining the predicted speed, the collision alerter compares the predicted speed and the current speed. If the predicted speed is greater than the current speed, the collision alerter adjusts the time-to-collision based on the predicted speed. Otherwise, if the predicted speed is less than or equal to the current speed, the collision alerter compares the time-to-collision to a second collision threshold. The collision alerter emits a second alarm (e.g., an intermittent audible signal) in response to the time-to-collision being less than or equal to the second collision threshold. The second collision threshold (e.g., 2.5 seconds) is greater than the first collision threshold (e.g., 0.7 seconds) such that the second collision threshold is associated with a less imminent potential collision than that of the first collision threshold. Thus, the example vehicle disclosed herein emits the first alarm (e.g., an uninterrupted audible signal) to warn the driver of an imminent potential collision and emits the second alarm (e.g., an intermittent audible signal) to warn the driver if the potential collision is less imminent.

Turning to the figures, FIG. 1 illustrates a vehicle 100 that is alerted to a potential collision with another vehicle 102 in accordance with the teachings herein. The vehicle 100 and/or the vehicle 102 may be a standard gasoline powered vehicle, a hybrid vehicle, an electric vehicle, a fuel cell vehicle, and/or any other mobility implement type of vehicle. The vehicles 100, 102 include parts related to mobility, such as a powertrain with an engine, a transmission, a suspension, a driveshaft, and/or wheels, etc. The vehicles 100, 102 may be non-autonomous, semi-autonomous (e.g., some routine motive functions controlled by the respective vehicle 100, 102), or autonomous (e.g., motive functions are controlled by the respective vehicle 100, 102 without direct driver input).

In the illustrated example, the vehicle 100 includes a sensor 104 that monitors an area around the vehicle 100. The sensor 104 detects an object near the vehicle 102 (e.g., the vehicle 100) and collects data that enables a location of the object relative the vehicle 100 to be determined. The sensor 104 may be a radar sensor (e.g., a radar sensor 316 of FIG. 3), a lidar sensor (e.g., a lidar sensor 318 of FIG. 3), an ultrasonic sensor (e.g., an ultrasonic sensor 320 of FIG. 3), a camera (e.g., a camera 322 of FIG. 3), and/or any other device that detects and identifies a relative location of a nearby object. For example, the sensor 104 may detect objects within a range of about 2.2 meters (86.6 inches) when the sensor 104 is an ultrasonic sensor. Further, in the illustrated example, the sensor 104 is a back-up sensor that monitors an area behind the vehicle 100. Additionally or alternatively, the vehicle may include a sensor that monitors an area in front of and/or to a side of the vehicle 100.

The vehicle 100 of the illustrated example also includes a speed sensor 106 and a pedal sensor 108. The speed sensor 106 determines a current speed of the vehicle 100, and the pedal sensor 108 measures pedal dynamics of the vehicle 100. For example, the pedal sensor 108 monitors a gas pedal and/or a brake pedal of the vehicle 100 to determine whether and to what extent the vehicle 100 will accelerate and/or decelerate. In some examples, the pedal sensor 108 is an accelerator pedal position sensor that monitors a position (e.g., an angular position) of a vehicle pedal to determine an upcoming acceleration and/or deceleration of the vehicle 100.

As illustrated in FIG. 1, the vehicle 100 includes a speaker 110 and a display 112 (e.g., a screen, a monitor, etc.). For example, the speaker 110 produces audio signals and the display produces visual signals for the driver and/or passenger(s) of the driver for informational and/or entertainment purposes.

Further, the vehicle 100 of the illustrated example includes a collision alerter 114 that determines a time-to-collision for a potential collision between the vehicle 100 and a nearby object (e.g., the vehicle 102) and provides a warning to the driver based on the time-to-collision. For example, the vehicle 100 of FIG. 1 is spaced apart from the vehicle 102 by a distance 116 and is moving in a direction 118 toward the vehicle 102. In operation, the collision alerter 114 determines the distance 116 between the vehicle 100 and the vehicle 102 based on data collected by the sensor 104. Based on the distance and the current speed of the vehicle 100, the collision alerter 114 determines the time-to-collision for the potential collision between the vehicles 100, 102.

The collision alerter 114 compares the time-to-collision to a first collision threshold. The first collision threshold is a duration of time (e.g., 0.7 seconds) that includes time for inherent delays related to enabling the driver to decelerate the vehicle 100 upon receiving a warning of a potential collision. For example, the first collision threshold accounts for the time it takes for the collision alerter 114 to detect an object and emitting an alarm based on that object, the driver to react to the alarm by actuating the brake pedal, and/or a braking system of the vehicle 100 to decelerate the vehicle based on actuation of the brake pedal.

When the time-to-collision is less than or equal to the first collision threshold, the collision alerter 114 emits a first alarm associated with the first collision threshold to warn the driver of a potentially imminent collision with the vehicle 102. In some examples, the first alarm includes an audible signal emitted by the speaker 110. Additionally or alternatively, the first alarm includes a visual signal presented via the display 112. The collision alerter 114 emits the first alarm to enable the driver to reduce (e.g., eliminate) a collision impact with the vehicle 102 by facilitating deceleration of the vehicle 100. For example, upon hearing the first alarm, the driver decelerates the vehicle 100 to avoid the potential collision with the vehicle 102. In some examples, the collision alerter 114 also emits the first alarm when the collision alerter 114 determines that the distance 116 between the vehicles 100, 102 is less than or equal to a threshold distance (e.g., 0.3 meters or 11.8 inches).

Otherwise, when the time-to-collision is greater than the first collision threshold, the collision alerter 114 determines a predicted speed of the vehicle 100 based on the current speed and the pedal dynamics. Subsequently, the collision alerter 114 compares the predicted speed to the current speed. When the predicted speed is greater than the current speed, the collision alerter 114 adjusts the time-to-collision based on the predicted speed. Otherwise, if the predicted speed is less than or equal to the current speed, the collision alerter 114 compares the time-to-collision to a second collision threshold. The second collision threshold is a duration of time (e.g., 2.5 seconds) that is greater than the first collision threshold. Thus, the second collision threshold includes addition time beyond that of inherent delays related to enabling the driver to decelerate the vehicle 100 upon receiving a warning.

When the time-to-collision is less than or equal to the second collision threshold, the collision alerter 114 emits a second alarm associated with the second collision threshold to warn the driver of a potentially collision with the vehicle 102. In some examples, the second alarm includes an audible signal emitted by the speaker 110. Additionally or alternatively, the second alarm includes a visual signal presented via the display 112. The collision alerter 114 emits the second alarm to enable the driver to facilitate deceleration of the vehicle 100 to reduce (e.g., eliminate) a collision impact with the vehicle 102.

Because the second collision threshold is greater than the first collision threshold, the second alarm provides the driver with more time to react to the potential collision. Thus, the collision alerter 114 emits the second alarm to warn the driver of potential collisions that are less imminent than those associated with the first alarm. To enable the driver of the vehicle 100 to differentiate between the two alarms (and the potential collisions associated with the respective alarms), the first alarm is different than the second alarm. For example, the first alarm includes an uninterrupted audible signal (e.g., a solid tone) emitted by the speaker 110, and the second alarm includes an intermittent audible signal (e.g., beeps) emitted by the speaker 110.

Figure 2:
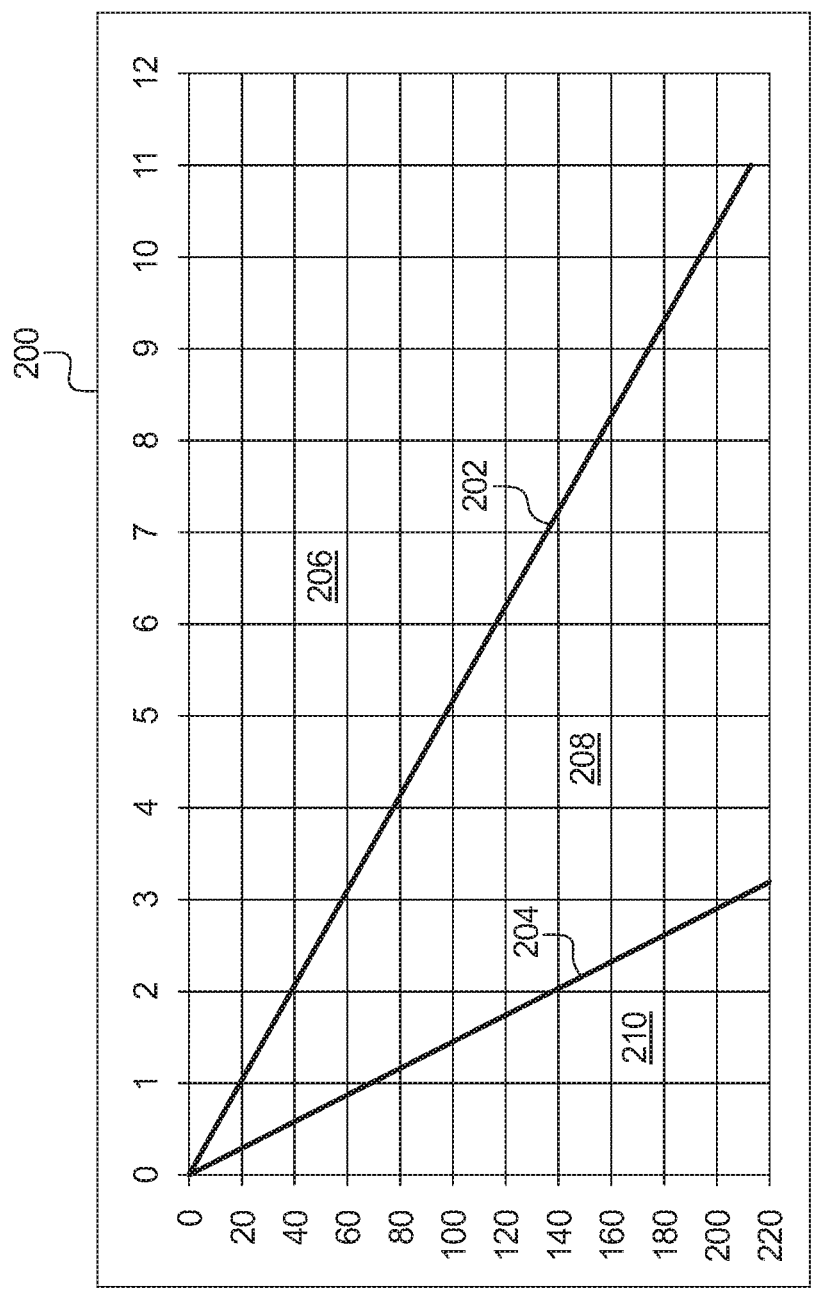
FIG. 2 is a graph depicting a first collision threshold and a second collision threshold utilized by the collision alerter of FIG. 1.

FIG. 2 is a graph 200 depicting a first collision threshold line 202 and a second collision threshold line 204. The x-axis of the graph 200 represents the speed of the vehicle 100 in kilometers per hour, and the y-axis of the graph 200 represents the distance 116 between the vehicle 100 and a detected object (e.g., the vehicle 102) in centimeters. In the illustrated example, the first collision threshold line 202 depicts a first collision threshold of 0.7 seconds, and the second collision threshold line 204 depicts a first collision threshold of 2.5 seconds.

As illustrated in FIG. 2, a first region 206 of the graph 200 is located to the right of the first collision threshold line 202, a second region 208 is located between the first collision threshold line 202 and the second collision threshold line 204, and a third region 210 is located to the left of the second collision threshold line 204. The first region 206 is associated with potentially imminent collisions, the second region 208 is associated with less imminent potential collisions, and the third region 210 is associated with situations in which a potential collision is not imminent. Thus, the collision alerter 114 emits the first alarm for any point along the first collision threshold line 202 or in the first region 206. The collision alerter 114 emits the second alarm for any point along the second collision threshold line 204 or in the second region 208. Further, the collision alerter 114 emits no alarm for any point in the third region 210. For example, if the vehicle 100 is moving at 2 kilometers per hour toward the detected object, the collision alerter 114 emits the first alarm if the object is less than about 39 centimeters away from the vehicle 100, emits the second alarm if the object is about between 39 centimeters and 139 centimeters away from the vehicle 100, and emits no alarm if the object is more than about 139 centimeters away from the vehicle 100.

Figure 3:
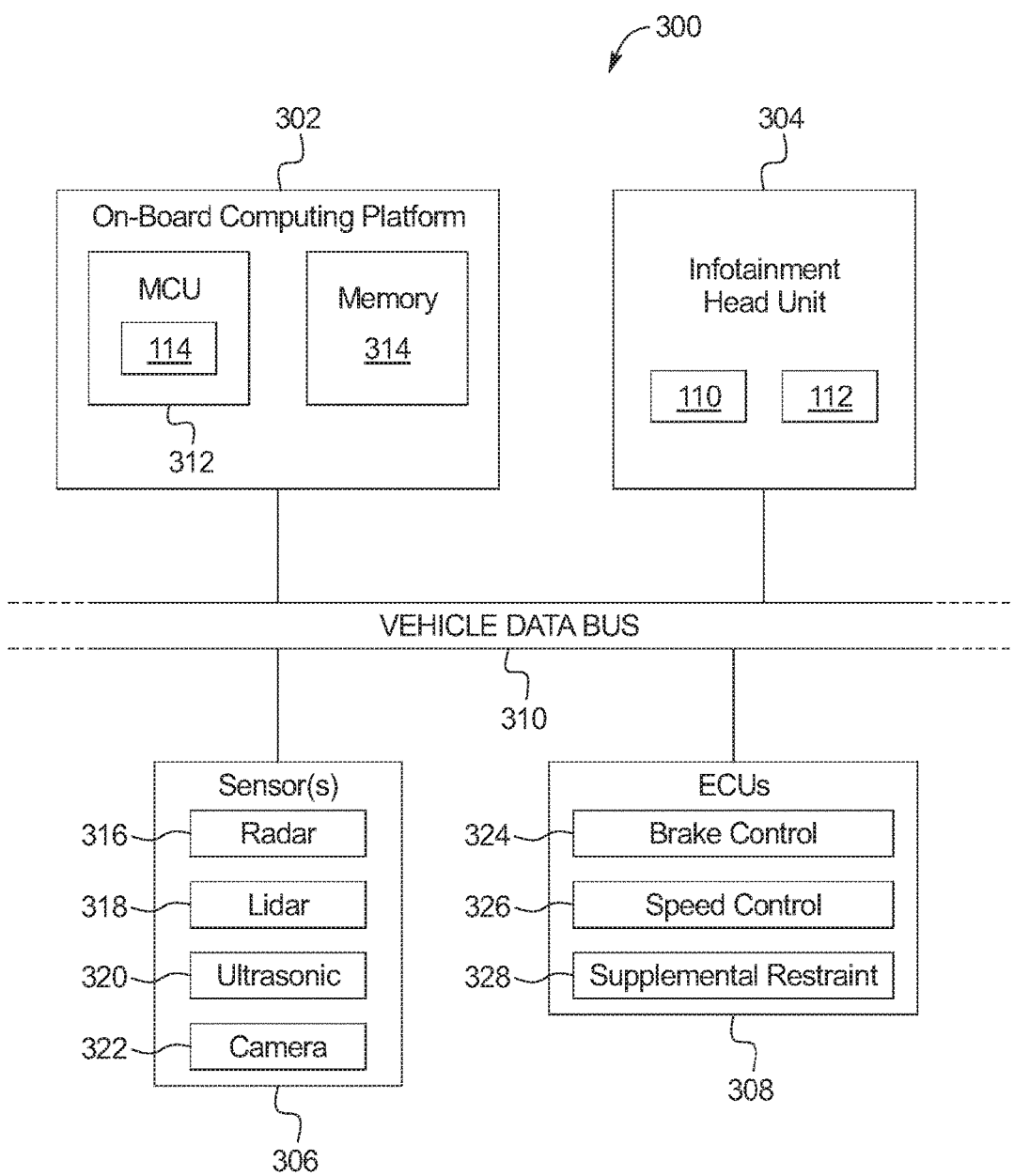
FIG. 3 is a block diagram of electronic components of the vehicle of FIG. 1.

FIG. 3 is a block diagram of electronic components 300 of the vehicle 100. As illustrated in FIG. 3, the electronic components 300 include an on-board computing platform 302, an infotainment head unit 304, sensors 306, electronic control units (ECUs) 308, and a vehicle data bus 310.

The on-board computing platform 302 includes a microcontroller unit, controller or processor 312 and memory 314. In some examples, the on-board computing platform 302 is structured to include the collision alerter 114. Alternatively, in some examples, the collision alerter 114 is incorporated into another electronic control unit (ECU) with its own processor 312 and memory 314. The processor 312 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 314 may be volatile memory (e.g., RAM including non-volatile RAM, magnetic RAM, ferroelectric RAM, etc.); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 314 includes multiple kinds of memory, particularly volatile memory and non-volatile memory.

The memory 314 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory 314, the computer readable medium, and/or within the processor 312 during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 304 provides an interface between the vehicle 100 and a user. The infotainment head unit 304 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. In the illustrated example, the infotainment head unit 304 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 304 displays the infotainment system on, for example, the center console display. In the illustrated example, the infotainment head unit 304 includes the speaker 110 to emit an audible warning to the driver and the display 112 to emit a visual warning to the driver.

The sensors 306 are arranged in and around the vehicle 100 to monitor properties of the vehicle 100 and/or an environment in which the vehicle 100 is located. One or more of the sensors 306 may be mounted to measure properties around an exterior of the vehicle 100. Additionally or alternatively, one or more of the sensors 306 may be mounted inside a cabin of the vehicle 100 or in a body of the vehicle 100 (e.g., an engine compartment, wheel wells, etc.) to measure properties in an interior of the vehicle 100. For example, the sensors 306 include accelerometers, odometers, tachometers, pitch and yaw sensors, wheel speed sensors, microphones, tire pressure sensors, biometric sensors and/or sensors of any other suitable type. In the illustrated example, the sensors 306 include the radar sensor 316, the lidar sensor 318, the ultrasonic sensor 320, and the camera 322. For example, the radar sensor 316 detects and locates an object (e.g., the vehicle 102) via radio waves, the lidar sensor 318 detects and locates the object via lasers, the ultrasonic sensor 320 detects and locates the object via ultrasound waves, and the camera 322 detects and locates the object by recording images and/or video of the object.

The ECUs 308 monitor and control the subsystems of the vehicle 100. For example, the ECUs 308 are discrete sets of electronics that include their own circuit(s) (e.g., integrated circuits, microprocessors, memory, storage, etc.) and firmware, sensors, actuators, and/or mounting hardware. The ECUs 308 communicate and exchange information via a vehicle data bus (e.g., the vehicle data bus 310). Additionally, the ECUs 308 may communicate properties (e.g., status of the ECUs 308, sensor readings, control state, error and diagnostic codes, etc.) to and/or receive requests from each other. For example, the vehicle 100 may have seventy or more of the ECUs 308 that are positioned in various locations around the vehicle 100 and are communicatively coupled by the vehicle data bus 310. In the illustrated example, the ECUs 308 include a brake control module 324, a speed control unit 326, and a supplemental restraint system 328. For example, the brake control module 324 controls brakes of the vehicle 100 based on input received from the sensors 306, and the speed control unit 326 controls a speed and/or acceleration of (e.g., performs auto-cruise for) the vehicle 100. The supplemental restraint system 328 (also known as a passive restraint system or an airbag system) controls deployment of airbags of the vehicle 100 upon the vehicle 100.

Figure 4:
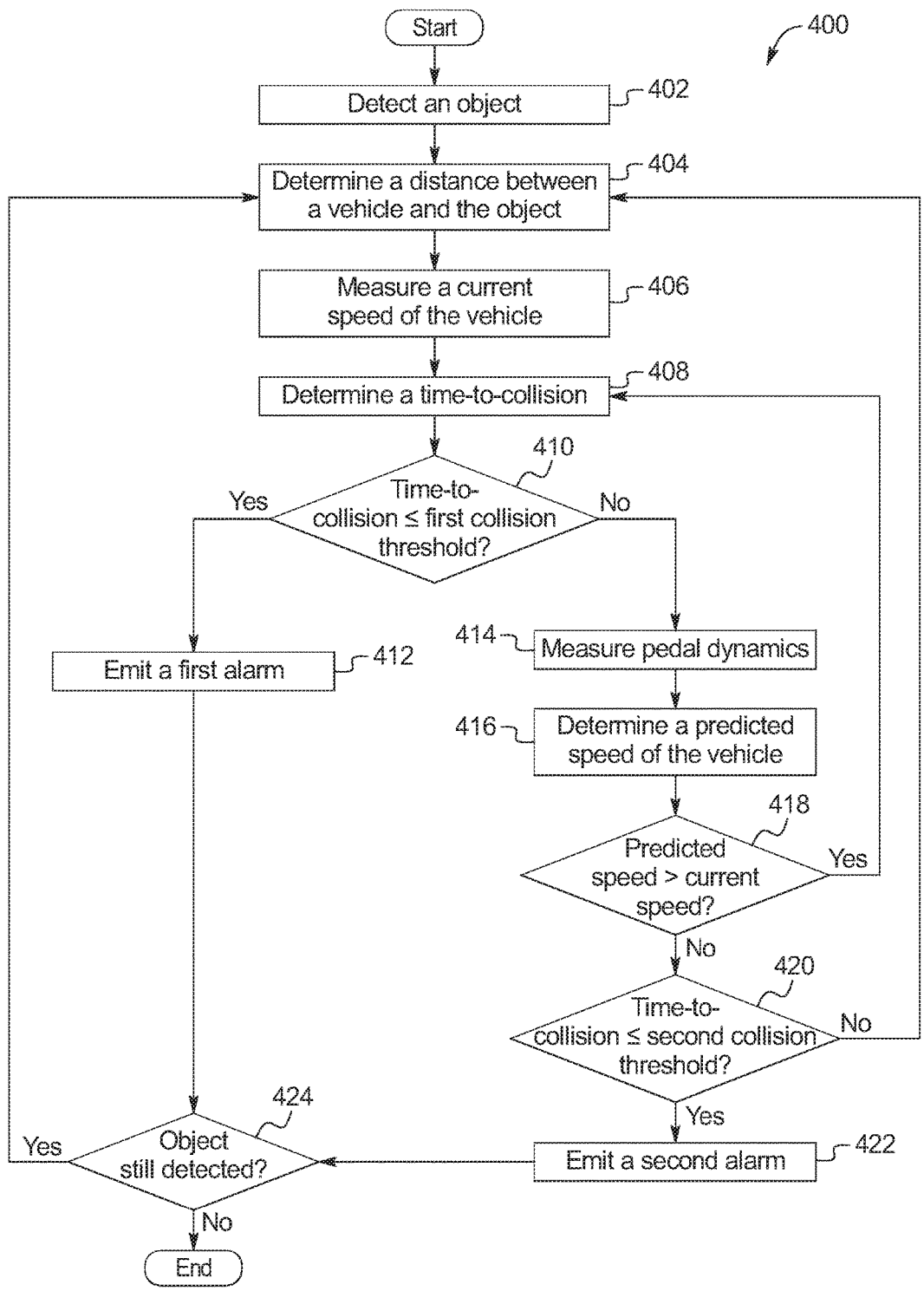
FIG. 4 is a flowchart of an example method to alert a driver of the vehicle of FIG. 1 of a potential collision via the collision alerter of FIG. 2.

FIG. 4 is a flowchart of an example method 400 to alert a driver of a vehicle of a potential collision with a nearby object. The flowchart of FIG. 4 is representative of machine readable instructions that are stored in memory (such as the memory 314 of FIG. 3) and include one or more programs which, when executed by a processor (such as the processor 312 of FIG. 3), cause the vehicle 100 to implement the example collision alerter 114 of FIGS. 1 and 3. While the example program is described with reference to the flowchart illustrated in FIG. 4, many other methods of implementing the example collision alerter 114 may alternatively be used. For example, the order of execution of the blocks may be rearranged, changed, eliminated, and/or combined to perform the method 400. Further, because the method 400 is disclosed in connection with the components of FIGS. 1 and 3, some functions of those components will not be described in detail below.

Initially, at block 402, the sensor 104 (e.g., the radar sensor 316, the lidar sensor 318, the ultrasonic sensor 320, the camera 322) of the vehicle 100 detects an object (e.g., the vehicle 102). At block 404, the collision alerter 114 determines the distance 116 between the vehicle 100 and the object. For example, the collision alerter 114 determines the distance 116 based on data collected by the sensor 104. At block 406, the speed sensor 106 measures a current speed of the vehicle 100. Further, at block 408, the collision alerter 114 determines a time-to-collision for a potential collision between the vehicle 100 and the object based on the distance 116 and the current speed of the vehicle 100.

At block 410, the collision alerter 114 compares the time-to-collision and a first collision threshold. If the time-to-collision is less than or equal to the first collision threshold, the method 400 proceeds to block 412 at which the collision alerter 114 emits a first alarm. If the time-to-collision is greater than the first collision threshold, the method 400 proceeds to block 414 at which the pedal sensor 108 measures pedal dynamics of a gas pedal and/or a brake pedal of the vehicle 100. Further, at block 416, the collision alerter 114 determines a predicted speed of the vehicle 100 based on the current speed and the pedal dynamics.

At block 418, the collision alerter 114 compares the predicted speed and the current speed of the vehicle 100. If the predicted speed is greater than the current speed, the method 400 returns to block 408 and adjusts the time-to-collision based on the predicted speed. Otherwise, if the predicted speed is less than or equal to the current speed, the method 400 proceeds to block 420 at which the collision alerter 114 compares the time-to-collision to a second collision threshold. If the time-to-collision is greater than the second collision threshold, the method 400 returns to block 404 to determine the distance 116 between the vehicle 100 and the object. Otherwise, if the time-to-collision is less than or equal to the second collision threshold, the method 400 proceeds to block 422 at which the collision alerter 114 emits a second alarm.

Upon emitting the second alarm at block 422 or emitting the first alarm at block 412, the collision alerter 114 determines whether the sensor 104 is still detecting the object. If the object is still detected, the method repeats blocks 404, 406, 408, 410, 412, 414, 416, 418, 420 to determine whether the collision alerter 114 is to continue to emit the current alarm, emit the other alarm, and/or emit no alarm. Otherwise, if the sensor 104 no longer detects the object, the method 400 ends.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a sensor to detect an object;
   a speed sensor to measure a current speed; and
   a collision alerter to:
      determine a distance to the object;
      determine a time-to-collision based on the distance and the current speed;
      emit, in response to the time-to-collision being less than or equal to a first collision threshold, a first alarm associated with the first collision threshold; and
      in response to the time-to-collision being greater than the first collision threshold, determine a predicted speed and compare the predicted speed and the current speed.

2. The vehicle of claim 1, wherein the first alarm includes an uninterrupted audible signal.

3. The vehicle of claim 1, wherein the collision alerter further emits the first alarm in response to the collision alerter determining that the distance to the object is less than or equal to a threshold distance.

4. The vehicle of claim 1, wherein the collision alerter emits the first alarm to facilitate deceleration to reduce a collision impact with the object.

5. The vehicle of claim 1, wherein the sensor is an ultrasonic sensor.

6. The vehicle of claim 1, further including a pedal sensor to measure pedal dynamics of a pedal.

7. The vehicle of claim 1, wherein the collision alerter determines the predicted speed based on the current speed and the pedal dynamics.

8. The vehicle of claim 1, wherein, in response to the predicted speed being less than or equal to the current speed, the collision alerter compares the time-to-collision to a second collision threshold that is greater than the first collision threshold.

9. The vehicle of claim 8, wherein, in response to the time-to-collision being less than or equal to the second collision threshold, the collision alerter is to emit a second alarm associated with the second collision threshold.

10. The vehicle of claim 9, wherein the second alarm includes an intermittent audible signal.

11. A method to emit a vehicle collision warning, the method comprising:
    detecting an object via a sensor of a vehicle;
    determining a distance to the object;
    measuring a current speed of the vehicle via a speed sensor;
    determining, via a processor, a time-to-collision based on the distance and the current speed;
    emitting a first alarm in response to the time-to-collision being less than or equal to a first collision threshold;
    determining, in response to the time-to-collision being greater than the first collision threshold, a predicted speed of the vehicle; and
    comparing the predicted speed and the current speed.

12. The method of claim 11, wherein emitting the first alarm includes emitting a solid tone via a speaker of the vehicle.

13. The vehicle of claim 11, further including emitting the first alarm in response to determining that the distance to the object is less than or equal to a threshold distance.

14. The method of claim 11, wherein determining the predicted speed includes measuring pedal dynamics of a pedal of the vehicle.

15. The method of claim 11, further including comparing, in response to the predicted speed being less than or equal to the current speed, the time-to-collision to a second collision threshold that is greater than the first collision threshold.

16. The method of claim 15, further including, in response to the time-to-collision being less than or equal to the second collision threshold, emitting a second alarm associated with the second collision threshold.

17. The vehicle of claim 16, wherein emitting the second alarm includes emitting an intermittent audible signal.

18. A vehicle comprising:
    a sensor to detect an object;
    a speed sensor; and
    a collision alerter to:
       determine a distance to the object;
       determine a time-to-collision based on the distance and a current speed;
       emit a first alarm when the time-to-collision is less than or equal to a threshold; and
       determine and compare a predicted speed to the current speed when the time-to-collision is greater than the threshold.

* * * * *